United States Patent [19]

Collomb et al.

[11] Patent Number: 4,748,221

[45] Date of Patent: May 31, 1988

[54] POLYMERIZATION OF OLEFINS USING A ZIEGLER-NATTA CATALYST AND TWO ORGANOMETALLIC COMPOUNDS

[75] Inventors: Joelle Collomb, Marseille, France; Daniel C. Durand, London, England; Lazslo Havas, Martigues; Frederic R. M. M. Morterol, Sausset-les-Pins, both of France

[73] Assignee: BP Chemicals Limited, London, England

[21] Appl. No.: 893,403

[22] Filed: Aug. 5, 1986

[30] Foreign Application Priority Data

Aug. 6, 1985 [FR] France ................................ 8511999

[51] Int. Cl.$^4$ ............................ C08F 2/34; C08F 10/02
[52] U.S. Cl. .................................... 526/153; 526/125; 526/88; 526/151; 526/348.4; 526/348.6; 526/901; 526/904
[58] Field of Search ................ 526/124, 125, 151, 153, 526/901, 904, 88

[56] References Cited

U.S. PATENT DOCUMENTS

| 3,878,124 | 4/1975 | Durand et al. | 526/119 |
| 3,922,322 | 11/1975 | Roger et al. | 526/904 |
| 4,511,703 | 4/1985 | Bailly | 526/904 |

FOREIGN PATENT DOCUMENTS 2024832  1/1980  United Kingdom ................ 526/904

Primary Examiner—Edward J. Smith
Attorney, Agent, or Firm—Brooks, Haidt, Haffner & Delahunty

[57] ABSTRACT

The present invention relates to a process for the polymerization of alpha-olefins in the gas phase in the presence of a Ziegler-Natta catalyst system consisting of a catalyst comprising atoms of halogen, magnesium and a transition metal, and cocatalysts based on an organometallic compound of a metal of Groups II or III of the Periodic Table of Elements, this catalyst system being previously converted into a prepolymer or a catalyst supported on a granular substance. This process is characterized in that the polymerization in the gas phase is carried out by contacting one or more alpha-olefins, on the one hand with the prepolymer or the supported catalyst system comprising an organometallic compound (a) which is only slightly volatile as cocatalyst, and on the other hand another cocatalyst consisting of an organometallic compound (b) which is relatively volatile, in such a way that the total quantity of cocatalyst employed is relatively small.

7 Claims, No Drawings

POLYMERIZATION OF OLEFINS USING A ZIEGLER-NATTA CATALYST AND TWO ORGANOMETALLIC COMPOUNDS

The present invention relates to a process for the production of polyolefins by polymerisation or copolymerisation mainly in the gas phase of alpha-olefins under low pressure, by means of Ziegler-Natta catalyst systems.

It is known that catalyst systems for polymerisation and copolymerisation of olefins known as Ziegler-Natta systems consist on the one hand, as catalyst, of compounds of transition metals belonging to Groups IV, V or VI of the Periodic Table of Elements, and on the other hand, as cocatalysts, of organometallic compounds of metals of Groups II or III of this Table. The catalysts most frequently used are the halogenated derivatives of titanium and vanadium, preferably associated with compounds of magnesium. Moreover, the cocatalysts most frequently used are organoaluminium or organozinc compounds.

Polymerisation of alpha-olefins in the gas phase is known, for example in a fluidised bed reactor in which the solid polymer in the course of formation is kept in the fluidised state by means of a rising gas stream comprising the alpha-olefins to be polymerised. The reaction gas mixture leaving the reactor is generally cooled before being recycled into the reactor, a supplementary quantity of alpha-olefins corresponding to the quantity consumed being added. The speed of fluidisation should be sufficiently high to provide homogeneity of the fluidised bed and to provide adequate cooling of the bed. The polymerisation may be performed by means of a catalyst system of a Ziegler-Natta type, introduced continuously or semi-continuously into the fluidised bed reactor. Withdrawal of the polymer produced may also be performed continously or semi-continously.

It is known that, prior to its utilisation for gas-phase polymerisation, the catalyst system may be converted into a prepolymer which is obtained during an operation referred to as "prepolymerisation", consisting in bringing the catalyst and cocatalyst into contact with one or more alpha-olefins. The catalyst system converted into prepolymer should be adapted to the gas-phase polymerisation conditions, especially as regards the dimensions of the prepolymer particles and its catalytic activity.

Gas phase polymerisation processes can be used to make polyolefins at high productivity (in terms of weight of polymer produced per unit weight of catalyst per hour). To manufacture at commercially useful production rates polyolefins containing very small quantities of catalyst residues and which can be converted into products without requiring any catalyst separation step, it is advantageous to use highly active catalyst systems. By using highly active catalyst systems it is possible to obtain relatively high rates of polymerisation in the gas phase, even when the alpha-olefin monomers are maintained at relatively low partial pressures. The ability of such highly active catalyst systems to polymerise alpha-olefins at relatively low partial pressures can provide a useful means of avoiding or reducing monomer condensation associated with the gas phase polymerisation or copolymerisation of easily condensible alpha-olefins.

It is known that the activity of certain Ziegler catalyst systems can be improved by increasing the quantity of organometallic compound used as the co-catalyst. In this case, it is generally necessary to employ in the polymerisation medium relatively large quantities of organometallic compounds as cocatalysts. However, this provides disadvantages including safety problems, related to the fact that these organometallic compounds spontaneously ignite on contact with air.

Moreover, processes for polymerisation of alpha-olefins in the gas phase usually employ a chain transfer agent in the reaction gas mixture, for example hydrogen, in order to reduce the mean molecular weight of the polyolefins produced. However, it is found that the simultaneous use of hydrogen and large quantities of organometallic compounds favours the hydrogenation reaction of the alpha-olefins to form alkanes, to the detriment of the polymerisation reaction. Whilst being inert in respect of the catalyst systems employed, the alkanes thus formed accumulate in the reaction gas mixture and diminish the productivity of the polymerisation process.

A number of techniques for the introduction of the cocatalyst has already been proposed, for example by in introducing the cocatalyst direct into the polymerisation reactor, or by contacting the catalyst and cocatalyst before their introduction into the polymerisation medium. In this latter case, however, having regard to the fact that the catalyst systems employed usually have maximum activity at the commencement of polymerisation, it may be difficult to avoid reaction runaways liable to involve the formation of hot spots and of agglomerates of molten polymer.

It is also possible to combine the two techniques for introduction of the cocatalyst mentioned above, by introducing into the polymerisation reactor an additional quantity of cocatalyst beyond that previously brought into contact with the catalyst. It has been observed, however, that under these conditions, it is necessary to employ in the polymerisation medium a relatively large quantity of cocatalyst, leading to the disadvantages mentioned above, the quantity being such that the atomic ratio of the total quantity of metal in the cocatalyst to the quantity of transition metal in the catalyst is comprised between 10 and 500, and generally comprised between 20 and 100.

The present invention relates especially to a process for polymerising alpha-olefins in the gas phase employing a catalytic system of the Ziegler-Natta type, comprising a catalyst in a prepolymer form, and a cocatalyst comprising at least two different organometallic compounds employed separately in the polymerisation process and in defined quantities. Surprisingly it is found that by using this process it is possible to achieve a high production rate of polyolefins without forming hot spots or agglomerates in the reactor and to obtain simultaneously a decrease in the hydrogenation reaction of the olefins to alkanes. Polyolefins can be prepared in this manner, having a relatively low content of catalytic residues.

The present invention provides a process for the polymerisation of alpha-olefins comprising the steps of (A) preparing a prepolymer-based catalyst, by contacting one or more alpha-olefins with a catalyst system of the Ziegler-Natta type consisting on the one hand of a catalyst comprising basically atoms of halogen, magnesium and a transition metal belonging to Groups IV, V or VI of the Periodic Table of Elements, and on the other hand of a cocatalyst based on one or more organometallic compounds of a metal belonging to Groups II or III of this Table, and (B) contacting the prepolymer-based catalyst under gas phase polymerisation conditions with one or more alpha-olefins in the presence of organometallic cocatalyst the process being characterised in that:

(1) the cocatalyst employed in step (A) is at least one low volatility organometallic compound (a) having a vapour pressure at 80° C. of less than 65 Pa, in a quantity such that the atomic ratio of the quantity of metal in the organometallic compound (a) to the quantity of transition metal in the catalyst is at least 0.5 and at most 2.5, preferably at least 0.8 and at most 2, and (2) the cocatalyst employed in step (B) is at least one volatile organometallic compound (b), having a vapour pressure at 80° C. equal to or greater than 65 Pa in a quantity such that the atomic ratio of the quantity of metal in the organometallic compound (b) to the quantity of transition metal in the prepolymer-based catalyst is as least 0.5, and that the atomic ratio of the total quantity of metal in the organometallic compound (a) and (b) to the quantity of transition metal in the catalyst is at least 2.5 and at most 9, preferably at least 3 and at most 7, the organometallic compound (b) being introduced into the polymerisation medium separately from the prepolymer-based catalyst.

The organometallic compound (a) employed in the process of the invention preferably comprises at least one low volatility organometallic compound of the general formula:

Al R$_n$ X$_{3-n}$ in which R represents an alkyl group comprising 4 to 20 carbon atoms, X is a hydrogen or halogen atom or an alcoholate group, and n is an integer or fraction which may have any value from 1 to 3. This organometallic compound (a) may be selected in particular from one or more of tri-n-butyl aluminium, tri-n-hexyl aluminium, tri-n-octyl aluminium, diisobutyl aluminium hydride and diisobutyl aluminium chloride. Organo-aluminium compounds of the polymeric type obtained by reaction between an aluminium trialkyl or an alkylaluminium hydride and isoprene, (for example compounds known under the name of "Isoprenyl Aluminium") are also suitable.

The organometallic compound (a) has a vapour pressure at 80° C. of less than 65 Pa, preferably of less than 40 Pa.

The organometallic compound (b) employed in the process of the present invention preferably comprises of one or more organoaluminium compounds, of the general formula:

Al R'$_n$ X$_{3-n}$ in which R' represents an alkyl group comprising from 1 to 3 carbon atoms, X is a hydrogen or halogen atom, or an alcoholate group, and n is an integer or fraction which may have any value from 1 to 3. It may be chosen preferably from amongst one or more of triethyl aluminium, tri-n-propyl aluminium, diethyl aluminium chloride and ethyl aluminium sesquichloride. One may also choose as organometallic compound (b) one or more volatile organozinc compounds such as diethyl zinc.

Preferably the organometallic compound (b) has a vapour pressure at 80° C. above 100 Pa, most preferably in the range 100–2000 Pa.

Preferably the organometallic compound (b) is introduced into the polymerisation reactor at a different point from that of the prepolymer-based catalyst (hereinafter referred to as "prepolymer"), preferably at a comparatively remote point. It may be introduced into the polymerisation medium continuously or semi-continuously, according to various known methods. For example it can be introduced in the liquid state or as a solution in one or more liquid alpha-olefins or in liquid saturated aliphatic hydrocarbons comprising, for example, from 4 to 6 carbon atoms.

The catalyst used according to the invention preferably corresponds in particular to the general formula:

Mg$_m$ Me$_n$ M(OR$_1$)$_p$(R$_2$)$_q$ X$_r$D$_s$ in which Me is an atom of aluminium and/or zinc, M is an atom of a transition metal belonging to Groups IV, V or VI of the Periodic Table of Elements, preferably an atom of titanium and/or vanadium, R$_1$ is an alkyl group comprising from 2 to 14 carbon atoms, R$_2$ is an alkyl group comprising from 2 to 12 carbon atom, X is an atom of chlorine and/or bromine, D is an electron donor compound comprising at least one atom of oxygen, or sulphur, or nitrogen, or phosphorus, where m is comprised between 0.5 and 50, preferably comprised between 1 and 10, n is comprised between 0 and 1, preferably comprised between 0 and 0.5, p is comprised between 0 and 3, q is comprised between 0 and 1, preferably comprised between 0 and 0.5, r is comprised between 2 and 104, preferably comprised between 3 and 24, and s is comprised between 0 and 60, preferably comprised between 0 and 20.

The catalyst may be obtained by various processes, for example those in which a compound of magnesium, such as magnesium chloride, is ground in the presence of at least one transition metal compound, or in which a magnesium compound is precipitated at the same time as one or more transition metal compounds.

For example, the catalyst may be obtained by reacting an organo-magnesium compound and a titanium compound taken at its maximum valency, optionally in the presence of an electron donor compound D, chosen, for example, from amongst amines, amides, phosphines, sulphoxides, and aliphatic ethers.

Preferably the catalyst is obtained by reacting at between −20° and 150° C. one or more compounds of tetravalent titanium, of the formula:

TiX$_{4-t}$(OR$_1$)$_t$ in which X is a chlorine or bromine atom, R$_1$ is an alkyl group containing from 2 to 14 carbon atoms and t is an integer or fraction comprised between 0 and 3, and an organo-magnesium compound of the formula R$_2$ MgX or of the formula Mg(R$_2$)$_2$ in which X is a chlorine or bromine atom and R$_2$ is an alkyl group comprising from 2 to 12 carbon atoms. The reaction between the tetravalent titanium compound or compounds and the organo-magnesium compound is advantageously performed in the presence of an alkyl halide of the formula R$_2$X in which R$_2$ and X have the same definitions as above, and optionally in the presence of the electron donor compound D.

Another technique for the preparation of the catalyst consists in reacting at between −20° C. and 150° C. magnesium metal, with an alkyl halide and one or more tetravalent titanium compounds, these latter compounds corresponding to the formulae $R_2X$ and $TiX_{4-t}(OR_1)_t$ respectively defined above, optionally in the presence of the electron donor compound D. In this case the reactants can be used in molar ratios such that:

$TiX_{4-t}(OR_1)_t/Mg$ is comprised between 0.05 and 0.5, and preferably comprised between 0.1 and 0.33, $R_2X/Mg$ is comprised between 0.5 and 8, and preferably comprised between 1.5 and 5, and $D/TiX_{4-t}(OR_1)_t$ is comprised between 0 and 0.5, and preferably comprised between 0 and 0.2.

The catalyst can also be prepared by precipitation of a transition metal compound on to solid particles consisting basically of magnesium chloride.

The solid particles of magnesium chloride can, for example, be prepared by reacting an organo-magnesium compound and a chlorinated organic compound, using the following conditions:

the organo-magnesium compound is either a dialkyl magnesium of the formula $R_3 Mg R_4$, or an organo-magnesium derivative of the formula $R_3 Mg R_4, xAl(R_5)_3$, in which formulae $R_3$, $R_4$ and $R_5$ are identical or different alkyl groups having from 2 to 12 carbon atoms and x is a number comprised between 0.01 and 1;

the chlorinated organic compound is an alkyl chloride of the formula $R_6 Cl$ in which $R_6$ is a secondary or preferably tertiary alkyl group having from 3 to 12 carbon atoms;

the reaction is performed in the presence of an electron donor compound D, which can, for example, be selected from amines, phosphines, sulphoxides, sulphones or aliphatic ethers.

The precipitation of the transition metal compound onto solid particles of magnesium chloride can be performed by a reduction reaction of a transition metal compound such as titanium or vanadium, taken at its maximum valency, by means of organometallic compounds of metal of Groups II and III of the Periodic Table of Elements. Preferably a titanium compound is used of the formula $TiX_{4-t}(OR_1)_t$ in which $R_1$, X and t have the same definitions as above, the reduction being performed by means of a reducing agent chosen from amongst organomagnesium compounds of the formula $R_3 Mg R_4$, in which $R_3$ and $R_4$ have the same definitions as above, organo-zinc compounds of the formula $Zn(R_7)_{2-y}X_y$, in which $R_7$ is an alkyl group having from 2 to 12 carbon atoms, X is a chlorine or bromine atom and y is zero or one, or a fraction between zero and one, and organo-aluminium compounds of the formula $Al(R_8)_{3-z}X_z$, in which $R_8$ is an alkyl group having from 2 to 12 carbon atoms, X is a chlorine or bromine atom and z is zero, one or two, or a fraction between zero and two.

In the reduction reaction it is preferred to use a quantity of organometallic (i.e. organomagnesium, organozinc or organoaluminium compound) sufficient to reduce the titanium compound to a lower valency state. If an excess of such organometallic compound is employed, it is preferably separated from the catalyst before conducting the prepolymerisation step.

The said reduction reaction may optionally be carried out in the presence of an electron donor compound D such as described above, at a temperature comprised between −30° C. and 100° C., with stirring, in a liquid hydrocarbon medium. For the purpose of polymerising propylene or copolymerising propylene with ethylene or other alpha-olefins, the catalyst should have not only a satisfactory polymerisation activity, but also a high stereo specificity. In this case, one of the methods preferred for the preparation of the catalyst consists in impregnating with titanium tetrachloride solid particles of magnesium chloride, such as for example those obtained according to the method described above, this impregnation preferably being performed in the presence of an electron donor compound D.

Advantageously the preparation of such a catalyst can be carried out by a process comprising the following two stages:

(a) treatment of the solid particles of magnesium chloride using an electron donor compound D chosen in particular from amongst the esters of aromatic acids or aromatic ethers, (b) impregnation of the solid particles of magnesium chloride thus treated using titanium tetrachloride.

The quantity of the electon donor compound D used during the first stage is generally comprised between 0.06 and 0.2 mole of electron donor compound per mole of magnesium compound and the treatment temperature may be comprised between about 20° C. and 50° C. In the second stage, the solid particles of magnesium chloride are impregnated with titanium tetrachloride used pure or in a liquid hydrocarbon medium. One of the methods consists in particular in grinding the solid particles of magnesium chloride in the presence of titanium tetrachloride. The quantity of titanium tetrachloride should be sufficient to be able to fix on these particles from 0.5 to 3 gram atoms of titanium per 100 gram atoms of magnesium, it being possible for the impregnation temperature to be comprised between about 80° C. and 150° C.

The catalyst as prepared according to one of the aforedescribed methods generally occurs in the form of solid particles having a particle size generally less than 50 microns and a polymerisation activity which are generally unsatisfactory for direct use in gas fluidised bed polymerisation of olefins.

To overcome this problem the catalyst is converted into a prepolymer.

The conversion into prepolymer consists in contacting one or more alpha-olefins with the catalyst and at least one organometallic compound (a) used as cocatalyst, in quantities such that the atomic ratio of the quantity of metal in the organometallic compound (a) to the quantity of transition metal in the catalyst is at least 0.5 and at most 2.5, preferably at least 0.8 and at most 2. A part of the quantity of organometallic compound (a) employed may, however, be added to the prepolymer at the end of the conversion. The prepolymerisation can be performed either in suspension in a liquid medium, such as aliphatic hydrocarbons or liquid alpha-olefins, or in the gas phase. The prepolymerisation is stopped when the prepolymer contains from $2 \times 10^{-3}$ to $10^{-1}$, preferably from $4 \times 10^3$ to $3 \times 10^{-2}$ mg atom of transition metal per gram. When the prepolymerisation is performed in suspension in a liquid medium, the prepolymer may then be isolated in the form of a powder after drying in an atmosphere of inert gas, at a temperature comprised between about 50° and 80° C. The prepolymer powder obtained consists of solid particles having a mean diameter by mass comprised between 50 and 300 microns, and preferably comprised between 70 and 250 microns, which are dimensions compatible with use for polymerisation in the gas phase, especially by means of a fluidised bed.

The gas phase polymerisation can be carried out for example in a stirred reactor or preferably in a fluidised bed reactor in which the particles of polymer in course of formation are maintained in the fluidised state by means of a rising gas stream, propelled at a speed of from 2 to 10 times, preferably 5 to 8 times the minimum speed of fluidisation, that is to say generally comprised between 15 and 80 cm/sec, preferably comprised between 40 and 60 cm/sec. The rising gas stream comprises the monomeric material to be polymerised, optionally with other components, for example hydrogen (chain transfer agent) and/or inert gases, for example methane, ethane, propane or nitrogen. The monomeric material comprises the alpha-olefin or alpha-olefins to be polymerised and optionally a diene. The alpha-olefin or alpha-olefins to be polymerised generally comprise from 2 to 12 carbon atoms. As it passes through the fluidised bed, only a part of the alpha-olefin or alpha-olefins polymerises in contact with the polymer particles which are developing. The fraction of alpha-olefins which has not reacted leaves the fluidised bed and passes through a cooling system to absorb the heat produced during the reaction before being recycled into the fluidised bed reactor by means of a compressor.

The mean pressure in the reactor can be close to atmospheric pressure, but is preferably higher in order to increase the polymerisation speed. It can, for example be between 0.5 and 5 MPa.

The temperature is maintained in the reactor at a level sufficient for the polymerisation to be rapid, without however being too close to the softening temperature of the polymer, in order to avoid in this latter case the formation of hot spots and of polymer agglomerates. It is generally between 50° and 110° C., preferably between 70° and 100° C.

The catalyst system previously converted into prepolymer is introduced continuously or semi-continuously into the polymerisation reactor. The withdrawal of the polymer produced may also be performed continously or semi-continuously according to known methods. The polymer may be withdrawn from the reactor in particular by means of various mechanical devices. The preferred device consists in providing the lower part of the reactor with an aperture capable of being shut-off and communicating with a chamber in which is maintained a gas pressure lower than the reactor pressure. The opening of the aperture during a given period makes it possible to discharge into this chamber the desired quantity of polymer. Once the aperture has been re-closed the polymeric product can be recovered from the chamber.

The process of the invention makes it possible to obtain polyolefins with a low content of catalyst residues, not only of transition metal compounds but also of organometallic compounds used as co-catalysts. The polyolefins preferably contain less than $3 \times 10^{-4}$ mg atoms of transition metal per gram, more preferably less than $2 \times 10^{-4}$ mg atoms of transition metal. It is possible to produce under very advantageous and satisfactory industrial conditions a large number of different grades of polymers of alpha-olefins, for example, high density polyethylenes (density over 0.940), amongst which are the homopolymers of ethylene and copolymers of ethylene and alpha-olefins having from 3 to 12 carbon atoms, linear low-density polyethylenes (density less than 0.940) consisting of copolymers of ethylene and one or more alpha-olefins having from 3 to 12 carbon atoms, with a content by weight of units derived from ethylene of over 80%, dlastomeric terpolymers of ethylene, propylene and dienes, elastomeric copolymers of ethylene and propylene having a content by weight of units derived from ethylene comprised between about 30 and 70%, isotactic polypropylenes and copolymers of propylene and ethylene and other alpha-olefins, having a content by weight of units derived from propylene of over 90%, copolymers of propylene and 1-butene having a content by weight of units derived from 1-butene comprised between 10 and 40%.

The process of the invention makes it possible to obtain high rates of production of polyolefins using relatively small quantities of cocatalysts, under stable and reproducible gas-phase polymerisation conditions. These conditions are especially advantageous in overcoming certain safety problems and in reducing the formation of alkanes by hydrogenation of alpha-olefins in the presence of hydrogen.

The following non-restrictive Examples illustrate the present invention.

EXAMPLE 1

Preparation of the Catalyst

Into a 1-liter glass flask provided with a stirrer system and a heating and cooling device, there are introduced under an atmosphere of nitrogen at 20° C., 500 ml of n-hexane, 8.8 g of magnesium in powder form and 1.2 g of iodine successively. With stirring, the reaction mixture is heated to 80° C., and there are rapidly introduced 9.1 g of titanium tetrachloride and 13.7 g of tetrapropyl titanate, then slowly over 4 hours 74.5 g of n-butyl chloride. At the end of this time, the reaction mixture thus obtained is maintained for 2 hours with stirring and at 80° C., and it is then cooled to ambient temperature (20° C.). The precipitate obtained is then washed three times with n-hexane to give the solid catalyst (A) ready for use. Analysis of the catalyst (A) obtained shows that it contains per gram atom of total titanium:

0.9 g atom of trivalent titanium,
0.1 g of tetravalent titanium,
3.7 g atoms of magnesium, and
7.7 g atoms of chlorine and that the composition of the catalyst (A) corresponds to the general formula:

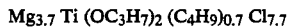

$$Mg_{3.7} Ti (OC_3H_7)_2 (C_4H_9)_{0.7} Cl_{7.7}$$

Preparation of the Prepolymer

Into a 5-liter stainless steel reactor, provided with a stirrer rotating at 750 revolutions per minute, there are introduced under nitrogen 3 liters of n-hexane which are heated to 70° C., 14 ml of a molar solution of tri-n-octyl aluminium (TnOA) in n-hexane and a quantity of catalyst (A) prepared as described above containing 14 mg atoms of titanium, these quantities being such that the atomic ratio Al:Ti is equal to 1.0. TnOA is an organo-aluminium compound, liquid under conditions of polymerisation or copolymerisation in the gas phase, having a vapour pressure at 80° C. of less than 0.13 Pa. The reactor is then closed and there are introduced hydrogen up to a pressure of 0.5 MPa and ethylene with a throughput of 160 g/hr for 3 hours. The prepolymer obtained (B) is then dried in a rotary evaporator at 70° C. under a current of nitrogen. It contains 0.029 mg atoms of titanium per gram.

Copolymerisation in a fluidised bed

In a fluidised bed reactor with a diameter of 45 cm, provided in its lower part with a fluidisation grid, there is circulated at 80° C. a rising gas stream at a speed of 45 cm/sec and consisting of a reaction gas mixture comprising hydrogen, ethylene, 1-butene and nitrogen, under the following partial pressures (pp):
  pp hydrogen: 0.23 MPa
  pp ethylene: 0.64 MPa
  pp 1-butene: 0.09 MPa
  pp nitrogen: 0.66 MPa There are introduced into the reactor 100 kg of an inert, anhydrous polyethylene powder as charge powder, then in a sequential manner approximately 5 g of prepolymer (B) every 210 seconds.

There are also introduced into the fluidised bed reactor, at a point located beneath the fluidisation grid, a 0.05 molar solution of triethyl aluminium (TEA) in n-hexane, at a regular throughput corresponding to 14 mmols of TEA per hour. TEA has a vapour pressure at 80° C. equal to 455 Pa and is essentially in the gaseous state under the conditions of polymerisation or copolymerisation of alpha-olefins in the gas phase. The total quantity of organo-aluminium compound present in the fluidised bed is such that the atomic ratio Al:Ti is equal to 6.6.

After a period of stabilisation of the production conditions of the copolymer of ethylene and 1-butene, by sequenced withdrawal approximately 25 kg/hr of copolymer powder are collected, whilst maintaining the weight of the fluidised bed constant at a value of 75 kg. In this way, at a relatively high production rate, equal to 95 kg copolymer per hour and per cubic metre of fluidised bed, a copolymer powder having the following characteristics is obtained:
  titanium content: $1.00 \times 10^{-4}$ mg atoms of titanium per gram;
  melt index ($MI_{2.16}$), measured at 190° C. under a 2.16 kg load: 5.8 g/10 minutes;
  density (at 20° C.): 0.937

Under these conditions, it is also found that ethane is formed in a relatively small quantity, such that the reaction gas mixture comprises 4.5% by volume of ethane.

The results are set out in Table I.

EXAMPLE 2

Copolymerisation in a Fluidised Bed

In the fluidised bed reactor used in Example 1 there is circulated at 80° C. a rising gas stream propelled at a speed of 45 cm/sec and consisting of a reaction gas mixture comprising hydrogen, ethylene, 1-butene and nitrogen, under the following partial pressures (pp):
  pp hydrogen: 0.20 MPa
  pp ethylene: 0.56 MPa
  pp 1-butene: 0.08 MPa
  pp nitrogen: 0.70 MPa There are introduced into the reactor 100 kg of an inert, anhydrous polyethylene powder, as charge powder, then every 120 seconds in a sequenced manner there are introduced approximately 5 g of prepolymer (B).

There is also introduced into the fluidised bed reactor at a point located below the fluidisation grid, a 0.05 molar solution of triethyl aluminium (TEA) in n-hexane, at a regular throughput corresponding to 12.5 mmols of TEA per hour. The total quantity of organo-aluminium compounds present in the fluidised bed is such that the atomic ratio Al:Ti is equal to 3.8.

After a period of stabilisation of the production conditions of the copolymer of ethylene and 1-butene, by sequenced withdrawal approximately 30 kg/hr of copolymer powder are collected, whilst maintaining the weight of the fluidised bed constant at a figure of 75 kg. In this way, at a high production rate equal to 110 kg of copolymer per hour and per cubic meter of fluidised bed, there is obtained a copolymer powder having the following characteristics:
  titanium content: $1.46 \times 10^{-4}$ mg atoms of titanium per gram;
  melt index ($MI_{2.16}$), measured at 190° C. under a 2.16 kg load: 5.7 g/10 minutes;
  density (at 20° C.): 0.938

Under these conditions, it is also found that a relatively small quantity of ethane is formed, such that the reaction gas mixture comprises 4.0% by volume of ethane.

The results are set out in Table I.

EXAMPLE 3

Copolymerisation in a Fluidised Bed

In the fluidised bed reactor used in Example 1 there is circulated at 80° C. a rising gas stream propelled at a speed of 45 cm/sec and consisting of a reaction gas mixture comprising hydrogen, ethylene, 1-butene and nitrogen, under the following partial pressures (pp):
  pp hydrogen: 0.17 MPa
  pp ethylene: 0.48 MPa
  pp 1-butene: 0.07 MPa
  pp nitrogen: 0.74 MPa There are introduced into the reactor 100 kg of an inert, anhydrous polyethylene powder, as charge powder, then every 155 seconds in a sequenced manner there are introduced about 5 g of prepolymer (B).

There are also introduced into the fluidised bed reactor, at a point located beneath the fluidisation grid, a 0.05 molar solution of triethyl aluminium (TEA) in n-hexane, at a regular throughput corresponding to 6 mmols of TEA per hour. The total quantity of organo-aluminium compounds present in the fluidised bed is such that the atomic ratio Al:Ti is equal to 2.8.

After a period of stabilisation of the production conditions of the copolymer of ethylene and 1-butene, by sequenced withdrawal approximately 20 kg per hour of copolymer powder are collected, whilst maintaining the weight of the fluidised bed constant at a value of 80 kg. In this way, at a production by rate of 65 kg of copolymer per hour and per cubic meter of fluidised bed, a copolymer powder having the following characteristics:
  titanium content: $1.67 \times 10^{-4}$ mg atoms of titanium per gram;
  melt index ($MI_{2.16}$), measured at 190° C. under a 2.16 kg load: 5.6 g/10 minutes;
  density (at 20° C.): 0.938.

Under these conditions it is also found that a relatively small quantity of ethane is formed, such that the reaction gas mixture comprises 2.5% by volume of ethane.

The results are set out in Table I.

EXAMPLE 4 (Comparative)

Copolymerisation in a Fluidised Bed

One operates exactly as in Example 1, except for fact that instead of introducing into the fluidised bed reactor 14 mmols of TEA per hour, 42.2 mmols of TEA per hour are introduced, so that the total quantity of organo-aluminium compounds present in the fluidised bed corresponds to an atomic ratio Al:Ti equal to 18.0.

After a period of stabilisation of the production conditions of the copolymer of ethylene and 1-butene, by sequenced withdrawal approximately 12 kg/hr of copolymer powder are collected, whilst maintaining the weight of the fluidised bed constant at a value of 72 kg. In this way, at a relatively low production by rate equal to 45 kg of copolymer per hour and per cubic metre of fluidised bed, a copolymer powder having the following characteristics is obtained:

titanium content: $2.07 \times 10^{-4}$ mg atoms of titanium per gram;

melt index ($MI_{2.16}$), measured at 190° C. under a 2.16 kg load: 6.8 g/10 minutes;

density (at 20° C.): 0.939.

Under these conditions, in which relatively large quantities of TEA are introduced into the fluidised bed, it is found that a large quantity of ethane is formed, such that the reaction gas mixture comprises 12.5% by volume of ethane. The large quantity of TEA introduced into the fluidised bed also has an unfavourable action on the rate of production by volume of the copolymer which also has a relatively high titanium content.

The results are set out in Table I.

EXAMPLE 5 (Comparative)

Copolymerisation in a Fluidised Bed

One operates exactly as in Example 1, except for the fact that instead of introducing into the fluidised bed reactor a 0.05 molar solution of TEA at the rate of 14 mmols of TEA per hour, a 0.05 molar solution of TnOA at the rate of 14 mmols of TnOA per hour is introduced.

After 48 hours of production of copolymer of ethylene and 1-butene, the formation of a liquid deposit in base of the reactor is found, beneath the fluidisation grid, and also it is observed that agglomerates of molten copolymer are deposited on the fluidisation grid, necessitating termination of the copolymerisation.

The results are set out in Table I.

EXAMPLE 6 (Comparative)

Preparation of the Prepolymer

One operates exactly as in Example 1, except for the fact that instead of introducing 14 mmols of TnOA into the reactor, 75.6 of TnOA are introduced. The quantities of catalyst and cocatalyst employed to prepare the prepolymer are therefore such that the atomic ratio Al:Ti 5.4.

In this way a prepolymer (C) is obtained which contains 0.029 mg atoms of titanium per gram.

Copolymerisation in a Fluidised Bed

One operates exactly as in Example 1, except for the fact that instead of using the prepolymer (B) and introducing into the fluidised bed reactor 14 mmols of TEA per hour, the prepolymer (C) prepared above is used and there are introduced into the fluidised bed reactor 3 mmols of TEA per hour. The total quantity of organo-aluminium compounds present in the fluidised bed is then such that the atomic ratio Al:Ti is the same as used in Example 1, that is to say, 6.6.

As soon as production of the copolymer of ethylene and 1-butene commenced, agglomerates of molten copolymer became deposited on the fluidisation grid, causing stoppage of the copolymerisation.

The results are set out in Table I.

EXAMPLE 7 (Comparative)

Preparation of the Prepolymer

One operates exactly as in Example 1, except for the fact that instead of introducing into the reactor 14 mmols of TnOA, 14 mmols of TEA are introduced. The quantities of catalyst and cocatalyst employed to prepare the prepolymer are therefore identical to those of Example 1, that is to say such that the atomic ratio Al:Ti is 1.0.

In this way a prepolymer (D) is obtained which contains 0.029 mg atom of titanium per gram.

Copolymerisation in a Fluidised Bed

One operates exactly as in Example 2, except for the fact that instead of using prepolymer (B), prepolymer (D) prepared above is employed.

After a period of stabilisation of the production conditions of the copolymer of ethylene and 1-butene, by sequenced withdrawal 16 kg/hr of copolymer powder are collected, whilst maintaining the weight of the fluidised bed constant at a value of 78 kg. In this way, at a production rate of 55 kg of copolymer per hour and per cubic meter of fluidised bed, a copolymer powder is obtained having the following characteristics:

titanium content: $5.00 \times 10^{-4}$ mg atoms of titanium per gram;

melt index ($MI_{2.16}$): 2.6 g/10 minutes;

density (at 20° C.): 0.937

Under these conditions, in which the prepolymer comprises a relatively volatile organo-aluminium compound, it is found that the production rate is relatively small, that the titanium content in the copolymer obtained is high and that the melt index of this copolymer is relatively low. The results are set out in Table I.

EXAMPLE 8

Copolymerisation in a Fluidised Bed

In a fluidised bed reactor with a diameter of 90 cm, provided in its lower part with a fluidisation grid, there is circulated a rising gas stream propelled at a speed of 45 cm/sec and consisting of a reaction gas mixture comprising hydrogen, ethylene, 4-methyl-pentene (4 MPI) and nitrogen, under the following partial pressures (pp):

pp hydrogen: 0.05 MPa pp ethylene: 0.32 MPa pp 4 MPI: 0.08 MPa pp nitrogen: 1.15 MPa The temperature of polymerisation is 80° C., and the temperature of the recycled gas is 63° C. The dew point of the recycled gas is 48° C.

There are introduced as charge powder 160 Kg of an inert, anhydrous powder, made of a copolymer of ethylene and 4 MPI produced in a previous operation then every 125 seconds 40 g of prepolymer (B), are introduced direct into the fluidised bed.

There are also introduced into the fluidised bed reactor, at a point located beneath the fluidisation grid, a 0.1 molar solution of triethyl aluminium (TEA) in n-hexane, at a regular throughput corresponding to 6.6 mmols of TEA per hour. The total quantity of organoaluminium compounds present in the fluidised bed is such that the atomic ratio Al:Ti is equal to 3.

After a period of stabilisation of the production conditions of the copolymer of ethylene and 4 MPI, by sequenced withdrawal approximately 160 Kg per hour of copolymer powder are collected, whilst maintaining the weight of the fluidised bed constant at a value of 350 Kg. The copolymer powder has the following characteristics:

titanium content $2 \times 10^{-4}$ mg atoms of titanium per gram;
melt index ($MI_{2.16}$), measured at 190° C. under a 2.16 Kg load: 0.9 g/10 minutes;
density (at 20° C.): 0.918

EXAMPLE 9

Copolymerisation in a Fluidised Bed

One operates as in Example 8, except for fact that the prepolymer contains a quantity of tri-n-octylaluminium such that the atomic ratio Al/Ti is equal to 1.5 and that no triethylaluminium was introduced into the reactor. The prepolymer D is introduced into the reactor at a rate of 40 g every 110 seconds.

The reaction gas mixture comprised hydrogen, ethylene, 4 MPI and nitrogen under the following partial pressures (pp):

pp hydrogen: 0.13 MPa
pp ethylene: 0.70 MPa
pp 4 MPI: 0.175 MPa
pp nitrogen: 0.595 MPa The temperature of polymerisation is 80° C. and the temperature of the recycled gas is 71° C. The dew point of the recycled gas is 70° C.

After a period of stabilisation of the production conditions of the copolymer of ethylene and 4 MPI, by sequenced withdrawal approximately 100 Kg/hr of copolymer powder are collected, whilst maintaining the weight of the fluidised bed constant at a value of 350 Kg.

The copolymer powder has the following characteristics:

titanium content: $3.7 \times 10^{-4}$ mg atoms of titanium per gram;
melt index ($MI_{2.16}$), measured at 190° C. under a 2.16 Kg load: 0.9 g/10 minutes;
density (at 20° C.): 0.918 to Groups IV, V or VI of the Periodic Table of Elements, and of a cocatalyst based on one or more organometallic compounds of a metal belonging to Groups II or III of this Table, and (B) contacting the prepolymer-based catalyst under gas phase fluidized bed polymerization conditions with ethylene or ethylene and one or more alpha-olefins in the presence of organometallic cocatalyst the process being characterised in that:

(1) the cocatalyst employed in step (A) is at least one low volatility organometallic compound (a) having a vapour pressure at 80° C. of less than 65 Pa, in a quantity such that the atomic ratio of the quantity of metal in the organometallic compound (a) to the quantity of transition metal in the catalyst is at least 0.5 and at most 2.5, and wherein said organometallic compound (a) is an organo-aluminium compound of the general formula $AlR_nX_{3-n}$ in which R represents an alkyl group comprising from 4 to 20 carbon atoms, X is a hydrogen or halogen atom, or an alcoholate group, and n is an integer or fraction which may have any value from 1 to 3, and (2) the cocatalyst employed in step (B) is at least one volatile organometallic compound (b), having a vapour pressure at 80° C. equal to or greater than 65 Pa in a quantity such that the atomic ratio of the quantity of metal in the organometallic compound (b) to the quantity of transition metal in the prepolymer-based catalyst is at least 0.5, and that the atomic ratio of the total quantity of metal in the organometallic compound (a) and (b) to the quantity of transition metal in the catalyst is at least 2.5 and at most 9, the organometallic compound (b) being introduced into the polymerisation medium separately from the prepolymer-based catalyst, and wherein the organometallic compound (b) is an organo-aluminium compound of the general formula $Al\,R'_n\,X_{3-n}$ in which R' represents an alkyl group comprising from 1 to 3 carbon atoms, X is a hydrogen or halogen atom or an alcoholate group and n is an integer or fraction which may have any value from 1 to 3.

2. A process as claimed in claim 1 wherein the organometallic compound (a) has a vapour pressure at 80° C. of less than 40 Pa.

3. A process as claimed in claim 1 wherein the organometallic compound (b) has a vapour pressure in the

TABLE I

COPOLYMERISATION OF ETHYLENE AND 1-BUTENE IN A FLUIDISED BED

| Example | Nature of OrganoMetallic Compounds (a) | Nature of OrganoMetallic Compounds (b) | Atomic Ratios Al/Ti present in the prepolymer | Atomic Ratios Total Al:Ti present in the fluidised bed | Production Rate (kg/hr × m³) | Ethane in the reaction gas mixture (% by volume) | Copolymer: Titanium Content (mg atoms of Ti per gram) | $MI_{2.16}$ (g/10 mins) |
|---|---|---|---|---|---|---|---|---|
| 1 | TnOA | TEA | 1.0 | 6.6 | 95 | 4.5 | $1.00 \times 10^{-4}$ | 5.7 |
| 2 | TnOA | TEA | 1.0 | 3.8 | 110 | 4.0 | $1.46 \times 10^{-4}$ | 5.8 |
| 3 | TnOA | TEA | 1.0 | 2.8 | 65 | 2.5 | $1.67 \times 10^{-4}$ | 5.6 |
| 4 (Comparative) | TnOA | TEA | 1.0 | 18.0 | 45 | 12.5 | $2.07 \times 10^{-4}$ | 6.8 |
| 5 (Comparative) | TnOA | TnOA | 1.0 | 6.6 | Slow appearance of agglomerates in fluidised bed | | | |
| 6 (Comparative) | TnOA | TEA | 5.4 | 6.6 | Rapid appearance of agglomerates in fluidised bed | | | |
| 7 (Comparative) | TEA | TEA | 1.0 | 3.8 | 55 | 3.5 | $5.00 \times 10^{-4}$ | 2.6 |

We claim:

1. A process for the polymerization or copolymerization of ethylene comprising the steps (A) preparing a prepolymer-based catalyst system of the Ziegler-Natta type consisting of a catalyst comprising basically atoms of halogen, magnesium and a transition metal belonging range 100 to 2000 Pa.

4. A process as claimed in claim 1 wherein the organometallic compound (a) is selected from one or more of tri-n-butyl aluminium, tri-n-hexyl aluminium, tri-n-octyl aluminium, diisobutyl aluminium hydride and diisobutyl aluminium chloride.

5. A process as claimed in claim 1 wherein the organometallic compound (b) is selected from one or more of triethyl aluminium, tri-n-propyl aluminium, diethyl aluminium chloride and ethyl aluminium sesquichloride.

6. A process as claimed in claim 1 wherein the prepolymer-based catalyst is obtained by contacting one or more alpha-olefins with the catalyst and at least one organometallic compound (a), in quantities such that the atomic ratio of the quantity of metal in the organometallic compound (a) to the quantity of transition metal in the catalyst is at least 0.5 and at most 2.5 and that it contains from $2 \times 10^{-3}$ to $10^{-1}$ mg atoms of transition metal per gram.

7. A process as claimed in claim 1, 2, 3, 4, 5 or 6 wherein the polymerization or copolymerization of ethylene in the gas phase under a pressure between 0.5 and 5 MPa and at a temperature between 50° and 110° C.

* * * * *

UNITED STATES PATENT AND TRADEMARK OFFICE
CERTIFICATE OF CORRECTION

PATENT NO. : 4,748,221
DATED : May 31, 1988
INVENTOR(S) : Joelle Collomb et al

It is certified that error appears in the above-identified patent and that said Letters Patent is hereby corrected as shown below:

Col. 6, line 63 should read "...from $4 \times 10^{-3}$ to..."

Col. 8, line 7 should read "...elastomeric terpolymers..."

Col. 11, line 23, period after "0.939" should be removed.

Col. 13, Table I, there should be a bracket after "(kg/hr X $m^3$)"

Col. 13, Table I, there should be a bracket after "(volume)"

Signed and Sealed this

Fifteenth Day of November, 1988

*Attest:*

DONALD J. QUIGG

*Attesting Officer*  *Commissioner of Patents and Trademarks*